United States Patent [19]
Costello et al.

[11] 3,965,292
[45] June 22, 1976

[54] PAPER HANDLING APPARATUS FOR FACSIMILE RECEIVER

[75] Inventors: Matthew J. Costello, Bethel; Donald T. Dolan, Ridgefield; Andre T. Dehaudringhien, Stamford; Antoon M. Hurkmans, New Milford; Kenneth R. Jasinski, Danbury; Edward G. Keplinger, Woodbury, all of Conn.

[73] Assignee: Graphic Sciences, Inc., Danbury, Conn.

[22] Filed: Feb. 21, 1975

[21] Appl. No.: 551,622

Related U.S. Application Data

[62] Division of Ser. No. 312,857, Dec. 7, 1972, Pat. No. 3,886,308.

[52] U.S. Cl. .................................... 178/42; 346/24
[51] Int. Cl.² ........................................ H04L 13/06
[58] Field of Search ............ 226/120, 137; 346/22, 346/24, 136; 178/42; 235/61.11 A, 11 E; 242/55.2, 67, 57.1, 68.7

[56] References Cited
UNITED STATES PATENTS

| | | | |
|---|---|---|---|
| 2,731,213 | 1/1956 | Groll | 242/78.7 |
| 2,912,501 | 11/1959 | Hewitt | 178/42 |
| 2,935,563 | 5/1960 | Hewitt | 178/42 |
| 3,343,173 | 9/1967 | Cooley | 346/24 |
| 3,373,264 | 3/1968 | Damerau | 235/61.11 A |
| 3,560,717 | 2/1971 | Patterson | 235/61.11 E |
| 3,585,289 | 6/1971 | Huber et al. | 346/24 |

*Primary Examiner*—Thomas A. Robinson
*Attorney, Agent, or Firm*—Kevin R. Peterson; Robert A. Green; William B. Penn

[57] ABSTRACT

Paper feeding and handling apparatus, especially for a facsimile receiver, including a cradle for supporting a roll of paper and for raising and lowering it to permit handling of the roll. Roll and guide means lead the paper from the supply roll to a writing station which also includes sheet-cutting means. A sheet-handling tray is disposed to receive the written and cut sheets, and various mechanical means are provided to feed and support the cut sheets.

17 Claims, 15 Drawing Figures

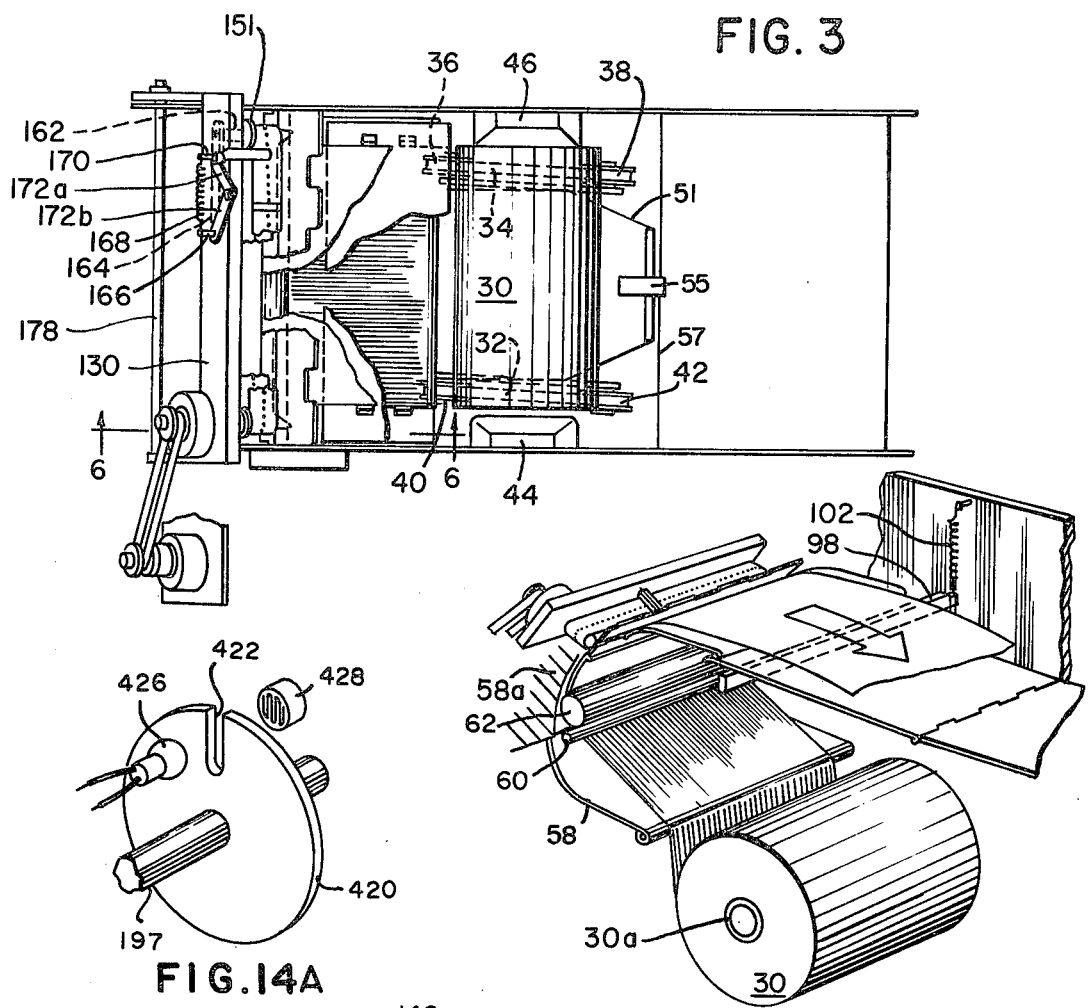
FIG. 3
FIG. 14A
FIG. 4
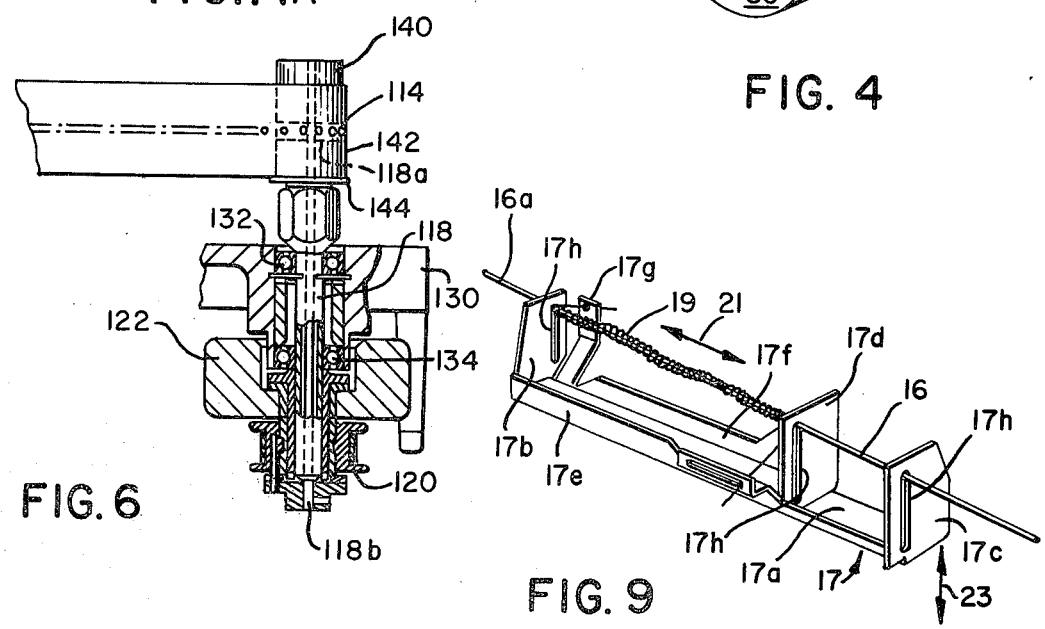
FIG. 6
FIG. 9

PAPER HANDLING APPARATUS FOR FACSIMILE RECEIVER

This is a division of application Ser. No. 312,857 file Dec. 7, 1972, now U.S. Pat. No. 3,886,308, issued May 27, 1975.

BACKGROUND OF THE INVENTION

A. Field of the Invention

The invention relates to facsimile systems, more particularly to a facsimile receiver.

B. Prior Art

Facsimile systems utilize a facsimile transmitter which scans a document and transmits signals representative of the contents of the document to a remote location where it is to be reproduced on a facsimile receiver. One example of a facsimile system is described in U.S. Pat. No. 3,614,319, issued Oct. 19, 1971 to Robert E. Krallinger et al and assigned to the assignee of the present invention. The system described in this patent utilizes a circular drum which rotates with respect to a "reading" head. The reading head generates signals indicative of the contents of a document which is wrapped around the drum, and it transmits these signals over a transmission medium to a remote receiver which reproduces the document. The facsimile system described in this patent produces excellent copy and is more than satisfactory for its intended purposes. However, it requires the use of an operator to load the document onto the transmitter and to unload the copy of the document from the receiver. In many cases it is desirable to provide facilities for at least the unattended reception of documents from remote locations.

In addition to the drum-type facsimile system described above, facsimile systems have also been build using a "flat-bed" scanning and reproducing system. In such a system, a document which is to be transmitted is placed on a flat table and scanned by a reading head moved across the document from side to side; the reading head is carried on a belt which rotates over pulleys. At the reproducing end, a stylus also carried by a belt moves across the paper from side to side in corresponding fashion to produce a copy of the original document. In order to avoid the "dead time" which occurs when the reading head or the stylus is returning to its starting position after scanning a line, a pair of reading heads and a pair of styli are commonly used.

Such a system imposes rather severe requirements on the reproduction process. The styli must be precisely located with respect to each other so that each starts reproduction of a line at the identical position on the paper: otherwise the beginning of the writing will vary from line to line and compromise the reproduction quality. It is difficult and expensive to maintain the necessary close tolerances in the manufacturing operation. Different wear rates of the styli or different forces pressing them against the copy paper may also cause adjacent lines to be reproduced with different optical densities, and this further compromises the reproduction quality.

An unattended receiver is especially advantageous wherever a large number of reports are to be received at a given station. For such an application however, it is necessary that the receiver paper feed and reproduction mechanism be especially free from jamming and other failures since there may be no attendant at hand to detect problems on their occurrence.

BRIEF DESCRIPTION OF THE INVENTION

A. Objects of the Invention

Accordingly, it is an object of the invention to provide an improved facsimile system.

Another object of the invention is to provide an improved facsimile receiver which is especially adapted for unattended reception of documents.

Yet another object of the invention is to provide an improved facsimile receiver of the flat-bed type.

A further object of the invention is to provide an improved facsimile receiver of the flat bed type which uses only a single stylus.

Yet a further object of the invention is to provide an improved facsimile receiver of the flat bed type which can accommodate documents of different length.

Still a further object of the invention is to provide an improved facsimile receiver of the flat bed type which automatically reproduces a document, cuts it to a predetermined length, and stacks it for ready removal from the receiver.

Another object of the invention is to provide an improved facsimile receiver of the flat bed type which has a simple yet effective paper feed mechanism.

B. Summary of the Invention

In a preferred embodiment of the invention, we avoid stylus alignment and other problems by utilizing a single stylus fixed to a belt rotating between two pulleys. The stylus "writes" during a traversal of the copy from one side to the other; it is deactivated during its return to the initial starting position.

To accommodate the receiver to the information rate of the incoming signal, the information for each line is first read into a single-line memory at the rate of the incoming information and is then read out from this register at twice this rate. Two pairs of storage registers are used for this purpose, the first of which stores the information for the first half of the line to be reproduced, while the second register stores the information for the second half of this line. Read-out of the first register commences with the beginning of read-in for the second register, so that during the latter half of the line reproduction cycle, read-out and read-in are being performed simultaneously. At the end of read-in for each line, both registers have been fully read-out so that they are prepared to receive the information the the next line.

The reproduction of copies in the facsimile receiver described herein occurs while the receiver is unattended. Once the receiver has been turned on, in response to a signal from a remote transmitter, it thereafter automatically feeds a supply of paper to the writing position, reproduces the contents of the original document on writing paper, cuts it to size, removes it from the writing position, stacks it in a tray, and awaits the next document.

DETAILED DESCRIPTION OF THE INVENTION

The foregoing will be more readily understood from the following detailed description of the invention when read in conjunction with the accompanying drawings in which:

FIG. 3 is a top plan view of the receiver of FIG. 2 with portions being removed for the purposes of clarity;

FIG. 4 is a view in perspective of a portion of the receiver showing the path of paper through the receiver;

FIG. 6 is a top plan view of the stylus belt drive, with portions cut away to illustrate construction;

FIG. 9 is a view in perspective of the stylus housing;

FIG. 14A is a perspective view of a paper monitor used in the apparatus of the invention.

PAPER FEED

Figure 1:
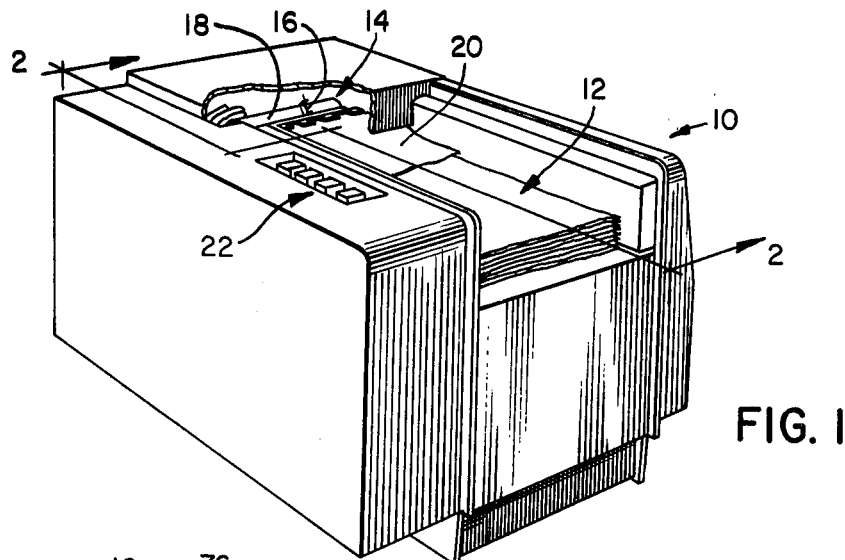
FIG. 1 is a view in perspective of a facsimile receiver in accordance with the invention.

In FIG. 1, a facsimile receiver 10 has a paper stacking and loading section 12 and a writing section 14 containing a stylus 16 mounted on a belt 18. The stylus 16 reproduces on a paper 20 information transmitted to the receiver 10 from a remote transmitter (not shown). Switches 22 are provided for turning the machine on and for performing other functions to be described below.

Figure 2:
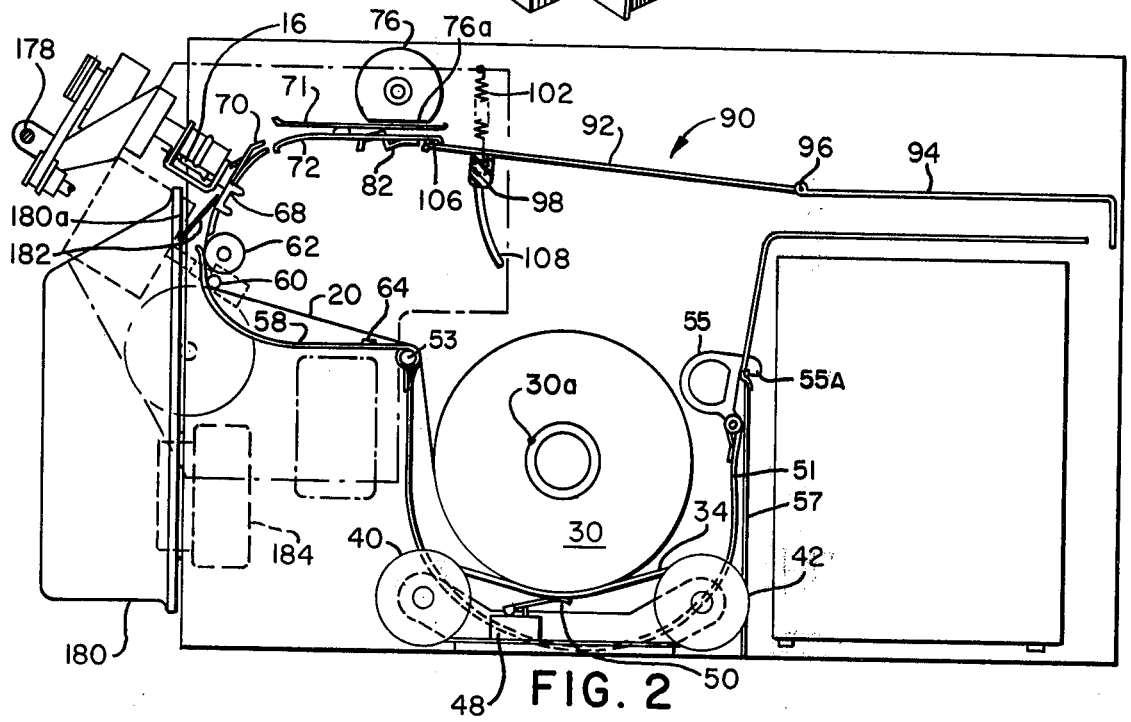
FIG. 2 is a side elevational view along the lines 2—2 of FIG. 1.

Referring now to FIGS. 2–4, a roll 30 of paper is cradled on belts 32, 34 which run over free-wheeling rollers 36, 38 and 40, 42 (FIG. 3) respectively. A pair of guides 44 and 46 are positioned at opposite ends of the roll. These guides assist in centering the roll 30 when a new roll is placed in the machine. Additionally, the guide 46 accurately positions one side of the roll 30 for feeding to the writing station. This positioning is accomplished by canting the axes of the wheels 36, 38 and 40, 42 with respect to the axis of the roll 30 (by a few degrees) so that the roll 30 "rides" toward the guide 46 and seats its shoulder against that guide.

A normally closed microswitch 48 (FIG. 2) is seated under the roll 30 and has an arm 50 contacting the lower side of this roll. When the roll 30 has a sufficient quantity of paper on it, it passes down on arm 50 and holds switch 48 open. The end of the copy paper is glued on a carboard mandrel 30a. When the paper supply is nearly depleted, and the copy paper is advanced to reproduce the last document, the mandrel is pulled off the belts 32, 34 by the paper feed. This releases arm 50 to thereby close switch 48 and signal the need for paper replenishment. A sling 51 of flexible sheet material has one end pivotally attached to a rod 53 and the other end attached to a hook 55. The hook 55 has a lip 55a which normally rests on a wall 57 in the machine. In this condition the sling 51 extends underneath the roll 30 between the belts 32, 34. When paper is to be loaded into the receiver, the operator grasps hook 55 and pulls it upwardly and rearwardly (to the right in FIG. 2) to extend it to a horizontal position. The roll 30 is then placed on the sling and the sling lowered, the guides 44, 46 seating the roll in position on the belts 32, 34.

The sheet 20 fed from the roll 30 passes over a guide tray 58, underneath a bar 60, and along a concave guide 58a into the nip of a paper feed roller 62. A stop 64 is located at one edge of the tray 58 to guide the paper into the roller 62. On leaving roller 62, the sheet is pressed firmly against guide 58A (FIG. 4) by opposing forces created by the push of roller 62 on the sheet on the one hand and the retarding force created by a wiper 182 on the other. Wiper 182 is a plastic sheet which extends across the receiver from one side to the other and which presses the sheet 20 against a writing table 68. The tip of stylus 16 contacts the sheet 20 slightly beyond this point. On leaving the writing table 68, the sheet passes under a bridge 70 (shown more clearly in FIG. 10) and follows along between platforms 71 and 72 under a pair of extractor wheels 74, 76 (shown in perspective in FIG. 10) having a flattened segment 74a, 76a. A pair of spring steel arms 80, 82 fastened to the platform 72 extend through apertures in this platform beneath the extractor wheels 74, 76 (see FIG. 10). The sheet normally passes freely between the arms 80, 82 and wheels 74, 76.

Figure 11:
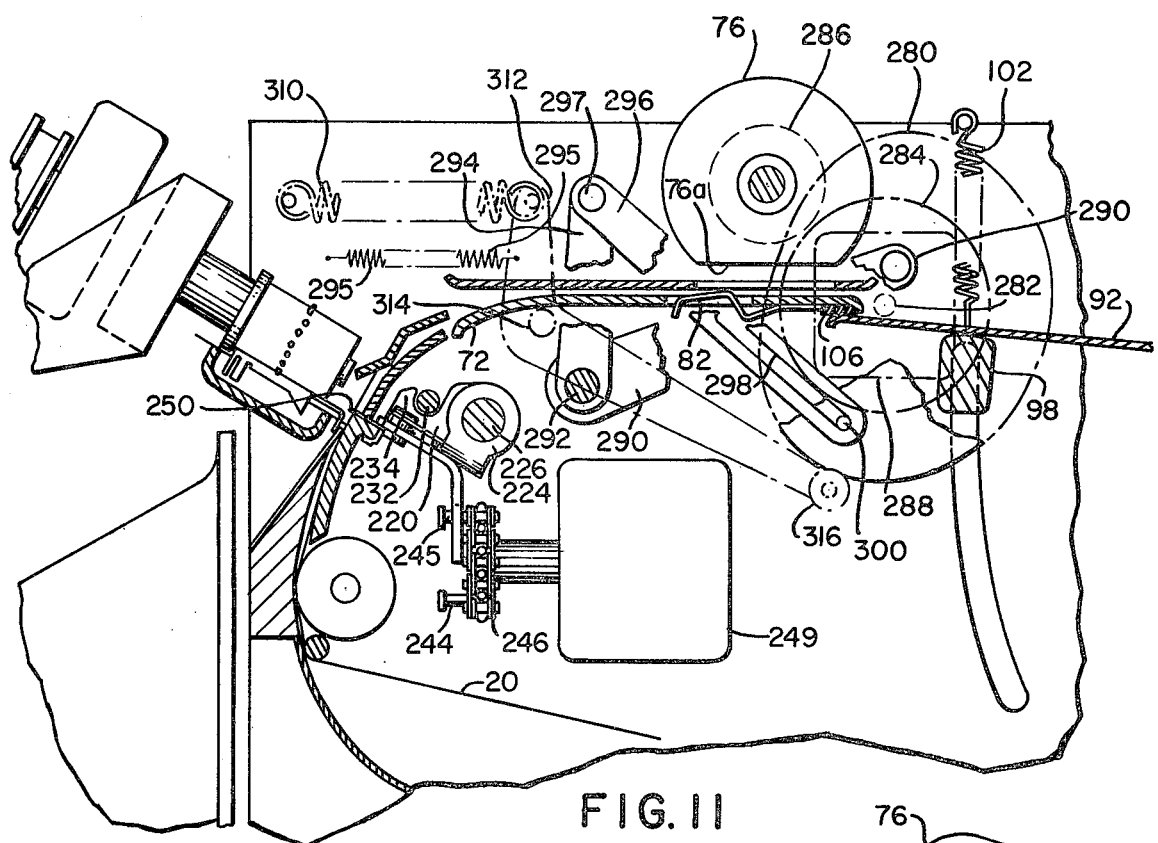
FIG. 11 is a side sectional view of the writing and paper extraction mechanism of the receiver.
Figure 10:
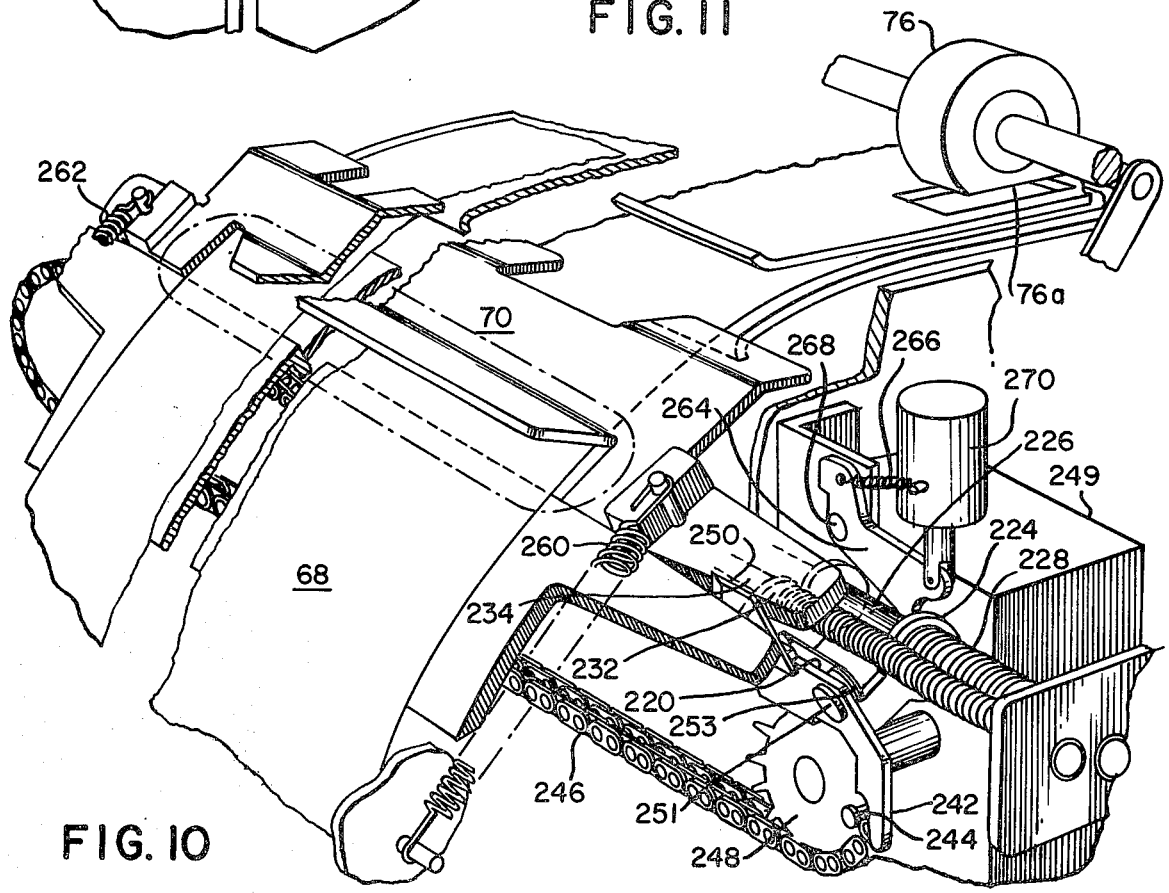
FIG. 10 is a view in perspective of the cutter mechanism of the receiver.

After the document has been completely reproduced on the sheet 20 at the writing station, the sheet is cut to size by a cutter head (shown in detail in FIGS. 10 and 11). The extractor wheels 74, 76 are then rotated to grasp the reproduced document and eject it onto a tray 90 comprising a front document receiving platform 92 hinged to a rear coverplate 94 by means of a hinge 96. The platform 92 rides over a bar 98 which extends from side to side within the receiver housing and which is suspended at its opposite ends by means of springs 100, 102 (FIGS. 2 and 4) connected to the housing. The bar 98 has pins at its opposite ends which ride in corresponding grooves 108 in the housing. The forward end of the platform 92 is lodged under a pad 106 attached to the underside of platform 72.

Positioned below the writing table 68 is a filter 180 (FIG. 2). Wiper 182 extends between the writing table 68 and an inlet section 180a of the filter 180 and extends laterally across the writing table 68 between the two sides of the receiver. It serves three functions: First, it contact the writing table 68 at a point just below the point of contact with the stylus 16 and thus presses the sheet 20 firmly against the writing table at this point to ensure good reproduction. Second, by creating friction forces on the sheet 20, it causes the sheet to bend against the guide 58A to ensure smooth, continuous paper feed. Third, it serves to guide the efflux generated by the pyrographic stylus into the filter 180, thus preventing clogging of the paper feed by carbon particles. Upper section 180a of filter 180 is an air inlet section; air is swept by the pyrographic stylus and through the inlet into the body of the filter by means of an exhaust fan 184 adjacent the bottom of the filter. The filter 180 is held to the receiver housing by screws (not shown) and can be removed for renewal.

WRITING HEAD

Figure 5:
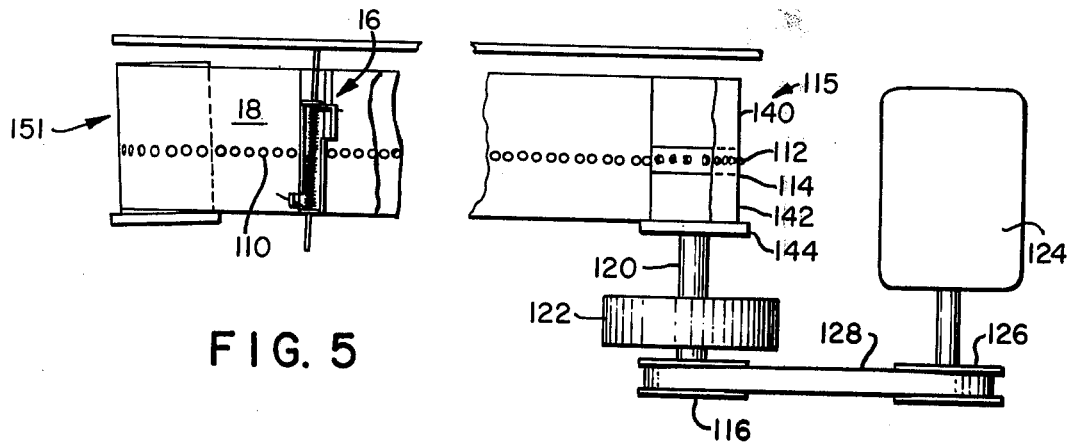
FIG. 5 is a top plan view showing the mounting of the stylus belt.

Referring now to FIGS. 5 and 6 in conjunction with FIG. 2–4, the writing section 14 has a stylus 16 mounted on a belt 18, as noted previously. The belt 18 has a number of centrally disposed apertures 110 which mate with corresponding teeth 112 of a sprocket 114 forming part of a pulley 115. The sprocket 114 is driven from a pulley 116 to which it is coupled by means of a torsional coupler shaft 118. The shaft 118 is connected at its inner end 118a to the sprocket 114 and is connected at its outer end 118b to an outer hollow shaft 120 to which the pulley 116 is attached. A fly wheel 122 is frictionally coupled to this hollow shaft and, together with the torsional coupler shaft 118, smooths out variations in the driving forces applied to the pulley 116 and thus the stylus 16. The pulley 116 is driven from a motor 124 by a pulley 126 and a belt 128. The hollow shaft 120 is supported from a frame forming a writing head 130 by means of bearings 132 and 134.

Freely rotating cylindrical pulley segments 140 and 142 are mounted on a shaft in common with the sprocket 114. The segment 142 has a flange 144 against which belt 18 rides. Normally the segments 140, 142 and the sprocket 114 would rotate together as a unit and be fixedly coupled to each other; accordingly, the segments 140 and 142 would also frictionally drive the belt 18. However, any irregularities in segments 140, 142 or in sprocket 114 would tend to advance or retard the belt 18 with respect to the sprocket 14, and this would enlarge the apertures 110 in the belt and thus lead to erratic writing characteristics or even ultimate failure of the belt drive. By making the pulley segments 140, 142 freely rotating therefore, this problem is avoided.

A second flanged pulley 151 on which belt 18 rides rotates freely on its shaft on bearings. As will be noted in connection with FIG. 5, the axis of this shaft is not strictly parallel to the axis of the sprocket 114 and pulley segments 140, 142 but is instead inclined to the latter axis at an angle of a few degrees. This ensures that the belt 18 will ride firmly against its flange and thus positively locate the belt and therefore the stylus with respect to the writing table 68.

Figure 7:
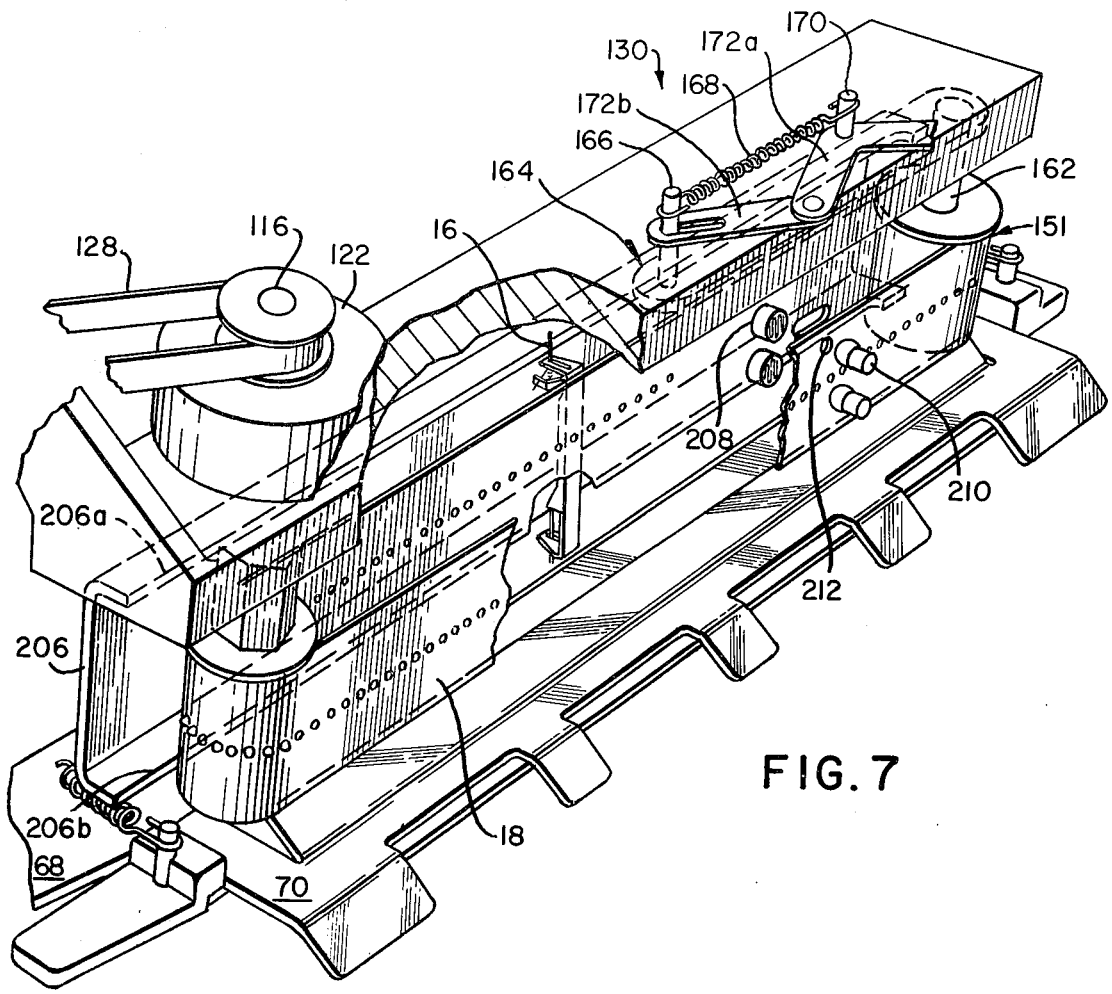
FIG. 7 is a view in perspective of the writing head of the receiver.
Figure 8:
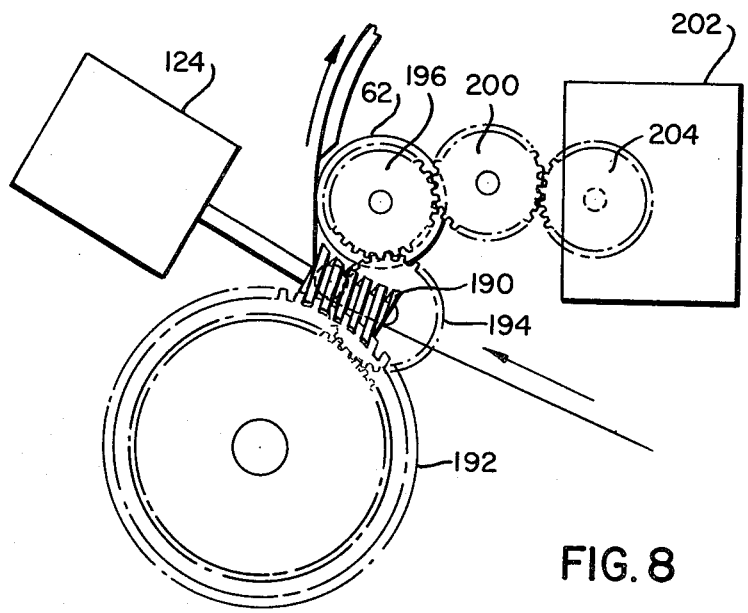
FIG. 8 is a sketch showing a portion of the paper feed and rapid paper advance mechanism.

Referring to FIG. 7, the pulley 151 rides on a shaft 162 inside the writing head 130. The shaft is connected to a slide 164 which connects through the frame 130 to a pin 166 extending through a slot in the housing. Pin 166 is connected by a spring 168 to a similar pin 170 which is rigidly attached to the outside of the housing 130. A pivoted scissor arm 172 having arm segments 172a and 172b extends between the pins 166 and 170. The scissor arm 172 consists of a "overcenter" mechanism. When it is in the position shown, it extends the pulley 151 away from the pulley 115 and thus holds the belt 18 taut. However, when the center of the scissor arm 172 is pushed downwardly, the scissor arm pushes the pin 166 away from the pin 170, extends the spring 168, and moves the shaft 162 toward the pulley 140, thereby slackening the belt 18. This allows the belt 18 to be readily removed from the pulleys. To facilitate removal, the frame 130 is pivoted about a shaft 178 (FIG. 2) so that this housing can be rotated (in a counterclockwise direction as seen in FIG. 2) away from the writing table 68 and bridge 70, thereby providing free access to the pulleys 115 and 151 and the belt 18.

PAPER CUTTING MECHANISM

Turning now to FIGS. 10 and 11, the cutter comprises a main body 220 extending upwardly to a collar 224. A rod 226 extends through the collar 224 and is connected at its opposite ends to the receiver housing. The body 220 is pivotally supported by rod 226 and rides along a guide rib 227 extending across the receiver beneath the writing table. A main spring 228 extends between the collar 224 and the receiver housing. A booster spring 230 is located on a rod 232 which also extends across the receiver from one side to the other and which is connected at its opposite ends to the receiver housing. The spring 230 extends between the receiver housing and a flange 234 extending from the body 220 up to the shaft 232. Pivotally mounted on body 220 is an arm 242 extending downwardly into an engagement with one of two pins 244, 245 carried on a chain 246. The chain 246 is driven via a sprocket 248 from a motor 249.

A cutter blade 250 extends from the platform 220 into an aperture formed at the ends of the writing table 68 and the stylus bridge 70. The blade pivots about a pivot 251 against a spring 253. As seen in FIG. 10, the stylus bridge 70 butts against the writing table 68; it is held against the writing table by means of springs 260, 262 extending between the outer portions of the stylus bridge and the receiver housing. A lever 264 loaded by a spring 266 and pivoting about a pivot 268 is actuated by a solenoid 270. In the position shown, arm 264 butts against collar 224 and restrains the cutter head. When the solenoid is actuated, it lifts arm 264 and frees the cutter head which is then driven along the shafts 224 and 232 by means of the springs 228 and 230. The solenoid is actuated automatically each time the copy paper is advanced to a predetermined length by the rapid paper drive. The head carries the cutter blade along between the writing table and the bridge from one side to the other, and this cuts the sheet 20 on the table 68. During this process, the bridge 70 is moved slightly away from the writing table 68 by the blade 250 to accommodate the thickness of the blade.

DOCUMENT EXTRACTION

After the paper has been cut to size, the document must be removed from the receiver. This is accomplished by the document extraction mechanism (FIG. 11) as follows: A cam 280 mounted on a shaft 282 has an inner gear 284 connected to the shaft for driving a corresponding gear 286 on one of the cutter extractor wheels 76. The shaft 282 is driven by a paper extractor motor 288. The size of the gears 284 and 286 are such that the gear 286 makes two revolutions for every one revolution of the gear 284. A bale 290 is pinned to a shaft 292. The shaft 292 is rotated by a lever 294 which is pivotally connected to a link 296 having a slot 298 which is engaged by a pin 300 connected to the cam 280.

When the extractor drive motor 288 is energized, it rotates gear 286 through gear 284; this causes the extractor wheel 76 to rotate. During the first 180 degrees of rotation of cam 280, wheel 76 makes one full revolution. As the circular portion of this wheel comes into contact with a document positioned between the guide plates 71 and 72, it presses the document against the springs 82 and advances it to the rear of the machine (to the right in FIG. 11) by an amount dependent on the extent of the circular segment. When the extractor wheel 76 has rotated to the point where the flat portion 76a is once again directly above the document so that the document is no longer advanced by it, the major portion of the document has been advanced onto the tray 92 while a portion (e.g. an inch or so) of the trailing or bottom edge of the document still lies between the guides 71, 72. This is extracted during the next 180 degrees of rotation of cam 280 as follows.

During the first 180 degrees of rotation of cam 280, the pin 300 rides loosely in the slot 298 of link 296 and the bale 290 is inactive. After the extractor wheel 76 has completed a full revolution, however, the cam 280 has rotated 180 degrees and the pin 300 has rotated to a position where it begins to carry the link 296 with it. When this occurs, link 296 begins to rotate lever arm 294 and thus rotates shaft 292. Bale 290 is pinned to shaft 292 and thus the bale rotates downwardly (clockwise), thus drawing the remaining segment of the paper out from between the guide 71, 72 and down onto the tray 92. The tray 92 then pushes bar 98 downwardly in a slot 108 against spring 102. As this occurs, the trailing edge of the paper flops onto the forward portion of the tray. As the cam 280 continues its rotation, the pin 300 gradually relieves the extending force on link 296 and lever 294 is thus returned to its original position by spring 295. At this point, the bale 290 rotates in a counter-clockwise direction, increasingly relieving the pressure on tray 92 which then moves up under the lip 106 against which it presses the trailing edge of the stacked documents on the tray. This prevents them from curling on the tray.

During the first 180 degrees of rotation of the cam 280, the extractor drive motor 288 need only supply enough torque to drive the extractor wheels 76 against the frictional forces between the paper and the guide plates 71, 72. During the next 180 degrees of rotation of the cam 280, however, the extractor motor 288 must drive the platform 92 downwardly against the spring 102 and also against the force of the spring 295. Without some mechanism for smoothing out the torque requirements imposed on the extractor drive motor 288, the motor would have to be large enough to meet the largest torque demands on it during the last 180 degrees of rotation of cam 280 and would therefore be greatly oversized with respect to the torque requirements for the first 180 degrees of cam rotation.

To prevent the necessity for utilizing a motor dictated by peak torque requirements, rather than by average torque requirements, we utilize an energy storing mechanism to "smooth" the torque required throughout the cam rotation cycle. The energy storage mechanism comprises a stiff spring 310 connected at one end to the receiver housing and at the other end to a shaped lever 312 pivoted about a pivot 314 and having a freely rotating roller 316 at a far end engaging the cam 280. During the first 180 degrees of rotation of the cam 280, a circular segment of the cam is presented to the roller 316 and accordingly the spring 310 is neither stretched nor compressed. During the last 90 degrees of rotation of the cam 280, the cam rotates the arm 312 clockwise around the pivot 314 to extend the spring 310 and thereby store energy in the spring. During the third 90 degrees of rotation, (from 180° to 270°) when the torque called for from the motor 288 is greatest, the cam surface presented to the roller 316 is such that the arm 312 rotates in a clockwise direction and delivers up its stored energy to the cam and thence to the bale 290 through pin 300 and link 296. The result is that a fairly constant torque requirement is presented to the motor 288 and thus a smaller motor than otherwise required can be used.

During extraction of the document from the receiver, the cutter blade remains at the far side of the receiver after it has cut the document to size. It is returned to its initial position when the motor 249 is energized. This occurs when a manual paper advance button is depressed or when the receiver is signalled that another document is to be transmitted to it. When motor 249 is energized, it drives chain 246 and a pin 245 at the far side of the receiver is swung around by the chain into a position where it catches arm 242, thereby retracting blade 250 against spring 253 and returning the cutter head to its initial position on the right-hand side of the receiver as shown in FIG. 11. As the cutter head reaches the solenoid 270, the collar 224 rides underneath the arm 264, elevating this arm in passing and allowing it to drop back down again to lock the collar 224 and thus the cutting head into position again until the solenoid 270 is again energized. The motor 250 is then turned off. During the return, the chain 246 brings the pin 244 to the far end of the receiver where it is available to pick up the cutter head for the subsequent return.

SYSTEM CONTROL

Figure 12:
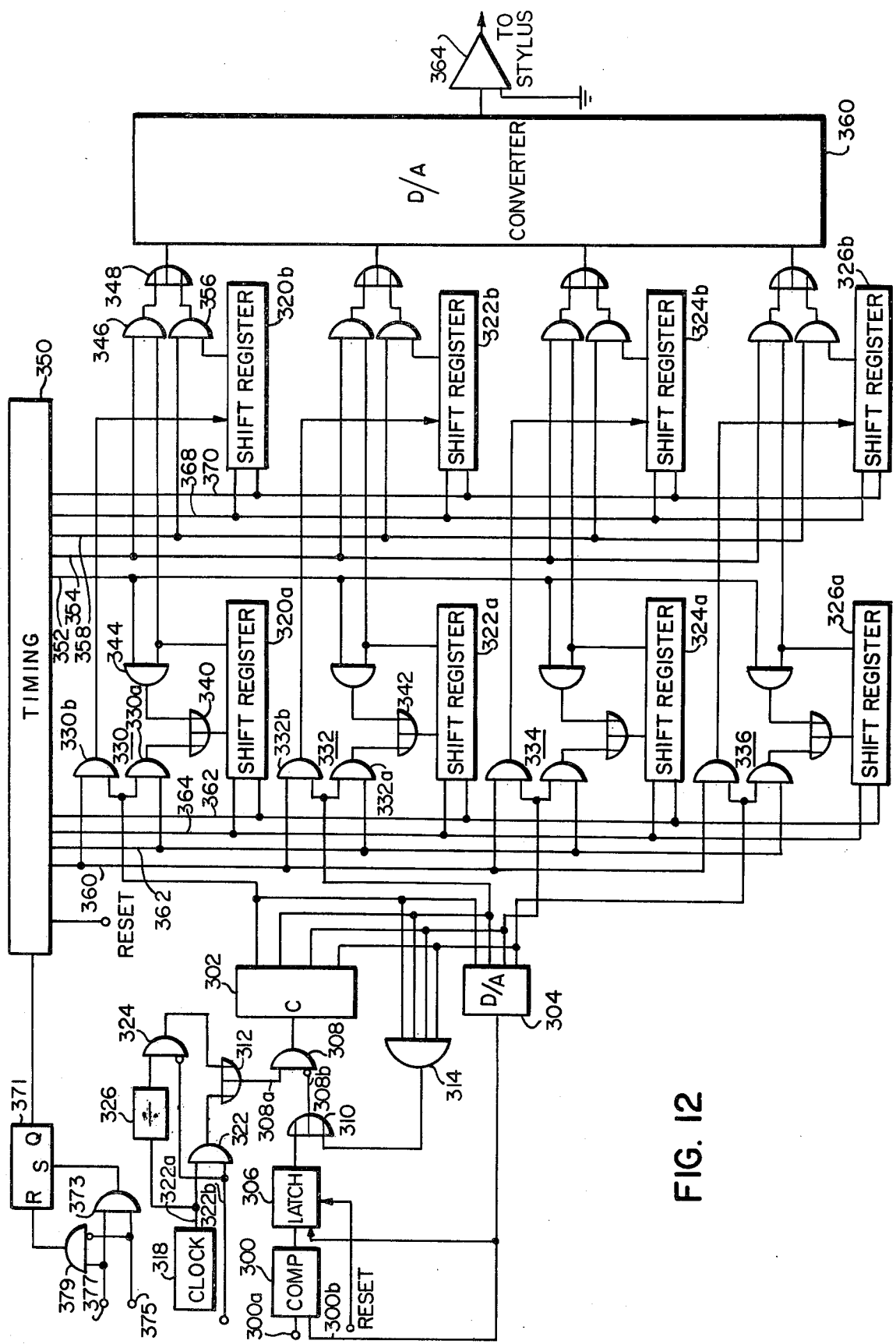
FIG. 12 is a schematic diagram of a scan converter in accordance with the invention.
Figure 13:
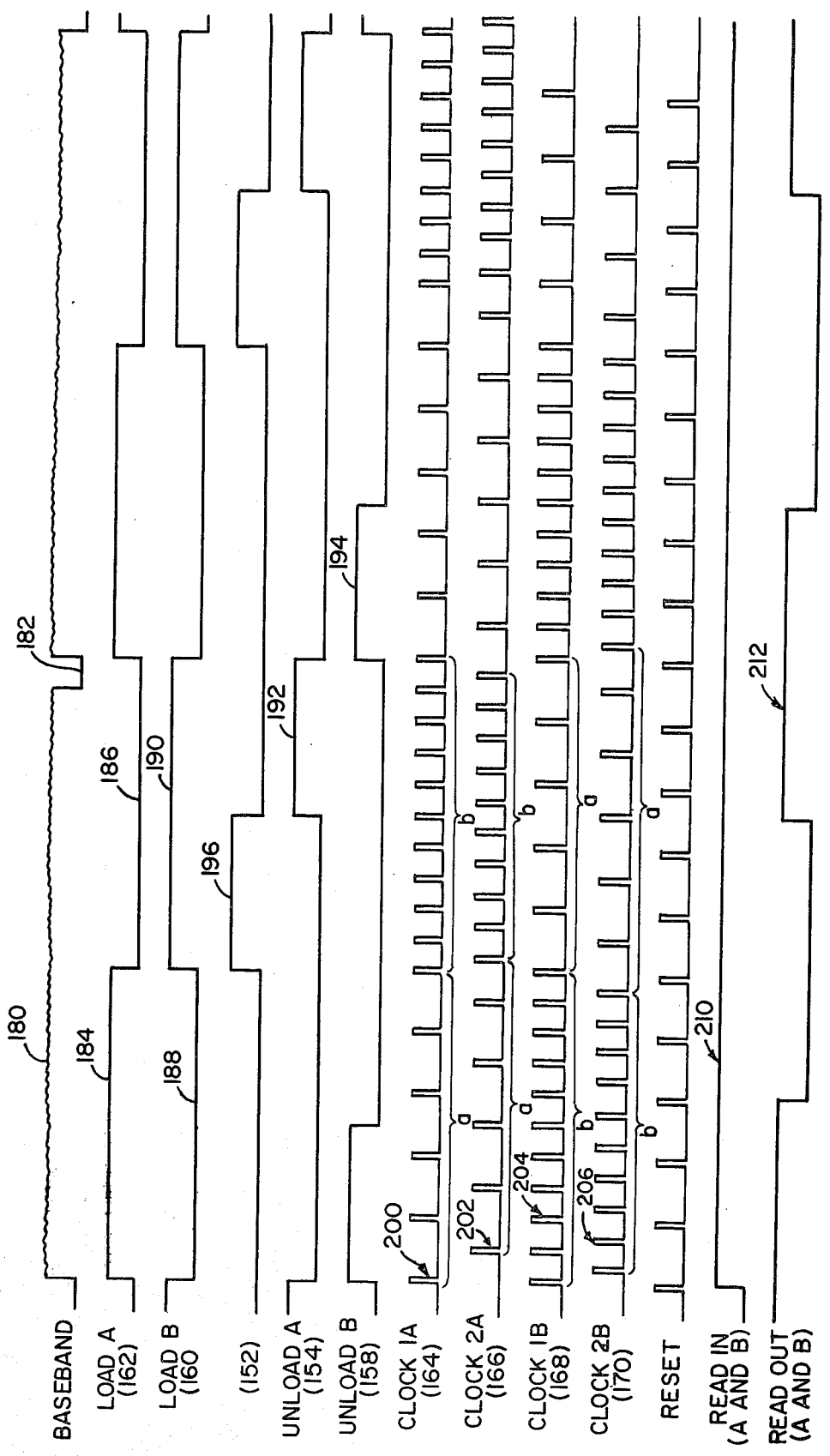
FIG. 13 is a sketch of waveforms of assistance in explaining the operation of the circuit of FIG. 10.
Figure 14:
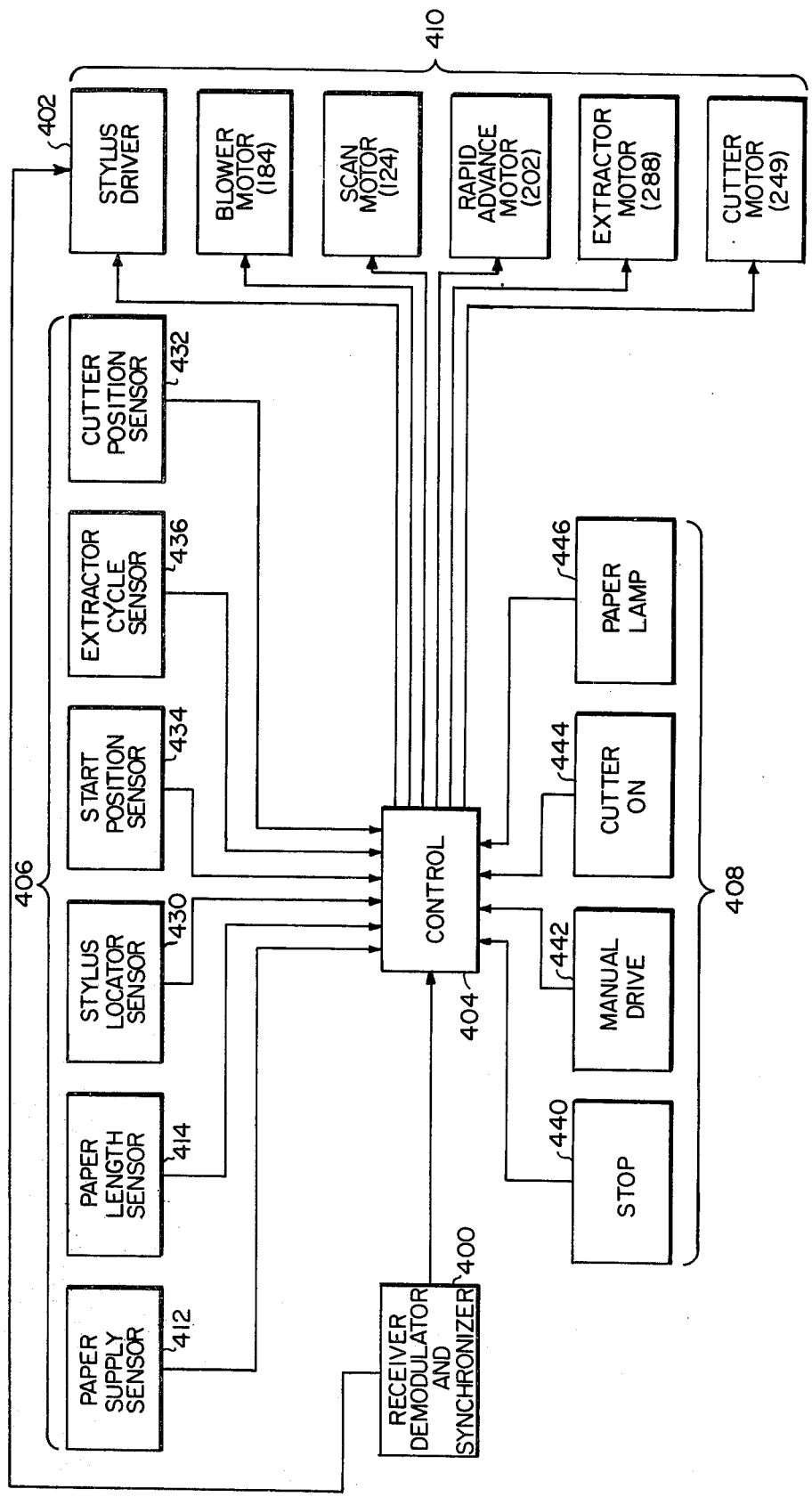
FIG. 14 is a block diagram of the overall control.

Referring now to FIG. 14, the overall control for the receiver is indicated in block diagram form. The incoming analog facsimile signal is applied to a demodulator and synchronizer 400 in the receiver. The demodulator and synchronizer advantageously is constructed as described in U.S. Pat. No. 3,614,319 referred to previously, and may also incorporate bandwidth compression circuitry of the type described in the U.S. Application No. 115,189 filed Feb. 16, 1971 by Robert E. Krallinger, et al. The demodulator and synchronizer provides an analog output representative of the contents of a document being scanned at a remote receiver. It supplies this output to a stylus driver 402 and also provides a synchronizing signal to a control unit 404. The control unit energizes the blower motor 184 at the start of a copy and also controls the stylus driver. The stylus driver supplies electrical signals to the stylus 16 for reproduction of a document on a copy sheet 20, as described previously. Included in the stylus driver is the data conversion circuit illustrated in FIG. 12, which accepts the analog input, digitizes it, and reads it out at twice its input rate for application to the stylus 16 only when the stylus is in writing position.

The control unit 404 receives inputs from a number of sensors, collectively designated as 406 as well as a number of manual controls, collectively designated 408, and energizes the stylus driver 402 and a number of motors, collectively designated 410, at appropriate times. Among the sensors 406 is a paper supply sensor 412 (which includes the micro-switch 48 of FIG. 2). It monitors the supply of paper in the machine and supplies an "out of paper " signal to the control unit 404, when the paper supply is exhausted. When this occurs, the control unit 404 signals the demodulator and synchronizer 400 that further copies cannot be made and this information is forwarded to any remote transmitter which attempts to contact the receiver for further transmission.

A paper length sensor 414 monitors the length of the document being reproduced. The control unit 404 terminates the normal paper advance when this length equals a predetermined length set by the operator in accordance with the setting of a paper length switch (not shown) in the sensor 414. A convenient paper monitor is illustrated in FIG. 14A and consists of a disc 420 having a notch 422 in its outer periphery and attached to the shaft 197 of feed roller 62 (FIG. 1). The disc is positioned to rotate between a light source 426 and a photocell 428. The photocell 428 is connected to a counter (not shown) whose count is advanced by one each time the slot 422 passes by the photodetector 428. The contents of the counter is compared with a reference (for example, a settable counter) which generates a signal proportional to the setting of the paper length switch in sensor 414. When the contents of the counter exceeds the reference, it signals the control unit 404 to terminate the normal paper drive. This is done by varying the drive to the scan motor 124 as shown in FIG. 14.

A stylus locator sensor 430 senses the position of the stylus with respect to the writing table and steps the scan motor 124 to position this stylus at a point out of the line of travel of the cutter-blade. Thereupon the control unit 404 energizes the cutter-return motor 249 to return the cutter to its initial position as previously described. When it returns to this position, a cutter position sensor 432 signals the control unit 404 to cut off further drive to the motor 249.

A "start position" sensor 434 signals the control unit 404 whenever the stylus is in writing position at the beginning of a line. The control unit 404 thereupon energizes the stylus driver 402 to enable reproduction of a line. The sensor 434 is formed by means of a photocell 208, a light source 210 and an aperture 212 as shown in FIG. 7.

After the sensor 414 has sensed that the desired length of paper has been fed to the writing station, it signals the control unit 454. This energizes the rapid advance motor 202 which advances the document a slight distance (an inch to an inch and a half) beyond the writing station. The cutter is then released as previously described and the document is thereupon cut to size. The extractor motor 288 is then energized from the control unit 404 and the document is extracted from the guides beyond the reproducing area and stacked on a receiving tray 92 (FIG. 2) as previously described. At the end of the extraction cycle, an extractor cycle sensor 436 (which may comprise a microswitch adjacent the cam 280 (FIG. 11) and which is actuated by a pin on this cam when the cam has rotated through 360 degrees) signals the control unit 454 which thereupon terminates the drive to the extractor motor 288. At this point the reproduction process is complete and the receiver awaits a new synchronizing signal to indicate that a new document is to be transmitted from a remote receiver.

The manual controls 408 include a stop button 440 which halts operation of the receiver; a manual drive button 442 which advances paper past the writing station as long as it is depressed and which assist in loading the receiver; and a "cutter on" button 444 which removes a latch from the cutter so that copies can be cut to length as desired. When this button is not depressed, the receiver makes copies on a continuous roll.

CONCLUSION

From the foregoing it will be seen that we have provided an improved facsimile receiver which reproduces documents automatically at remote locations while unattended. The receiver utilizes a single stylus to form the reproduction and to thereby avoid the myriad problems attendant on accurately positioning and synchronizing two or more styli.

The possibility of paper jams is minimized by utilizing a roll of paper which is cut to size as needed. The operation of the reproducing stylus, and the feed of paper to the writing station, are synchronized with each other to insure good copy quality. The copies are automatically removed from the writing station and stacked in sequence by an effective extractor mechanism.

It will be understood from the foregoing that various changes may be made in the preferred embodiment illustrated herein, and it is intended that the foregoing material be taken as an illustrative only and not in a limiting sense, the scope of the invention being defined in the claims.

Having described our invention, we claim:

1. Record paper feed and handling apparatus comprising
   a supply roll of paper,
   roll-supporting means for supporting said roll of paper including two pairs of belt-carrying rollers disposed to support said roll of paper horizontally,
   a flexible sling disposed beneath said roll of paper and between said belt-carrying rollers, said sling being adapted to be raised and lowered vertically to raise and lower said roll of paper out of and into operating position on said belt-carrying rollers,
   a paper feed station including a guide tray, a guide roller, and means for pressing the guide roller against said guide tray with the paper between them,
   a writing station including a writing table for supporting the paper, as an operation is performed thereon, and a wiper sheet for pressing the paper against the table as said operation is performed,
   means for cutting sheets from said roll of paper after work has been performed thereon at said writing station, and
   a sheet-receiving assembly adjacent to said work station for receiving cut sheets of paper, said assembly comprising paper-guiding means including first and second parallel plates, between which a sheet of paper is fed, a sheet-receiving tray, and a paper feed extractor for positively feeding sheets of paper from between said plates onto said tray.

2. A paper feed and extraction system according to claim 1 wherein
   said belt-carrying rollers include a first pair of freely rotating pulleys spaced apart from each other in a first direction corresponding to the direction in which paper is to be unwound from said roll,
   a second pair of freely rotating pulleys spaced apart from each other in said first direction and further spaced from said first pair in a second direction transverse to said first direction,
   first and second belts mounted on the first and second pulley pairs, respectively, and forming a cradle for supporting a roll of paper thereon with the axis of said roll extending in said second direction, and
   a guide for aligning an edge of the roll when said roll is butted against said guide,
   the pulley pairs being positioned so that one pair is elevated above the other whereby the roll of paper is continually urged against said guide as paper is unwound from it.

3. Apparatus according to claim 2 which includes a switch having a finger pressing against said roll and maintaining said switch in a first state as long as said roll is on said cradle, said finger being released and switching said switch to a second state when said roll is removed from said cradle.

4. The apparatus defined in claim 1 and including paper-gripping means associated with said sheet-receiving tray for gripping an end of a sheet of paper and preventing it from curling.

5. Apparatus as defined in claim 1:

A. in which said guide tray has a surface curing away from the line of travel of said paper as it extends between said writing table and said roll,
B. which includes a guide tab on said guide tray for initially locating the edge of said paper on said guide tray,
C. said paper rising out of contact with the curved surface and said guide tab when the feed roller engages the paper.

6. Apparatus as defined in claim 5 in which the wiper sheet pressing said paper against said writing table comprises a flexible plastic sheet extending transversely across said table and having a forward edge in contact therewith to press said sheet against said table.

7. Apparatus as defined in claim 6 in which said plastic sheet extends between said table and the inlet to a filter housing mounted adjacent said table and enclosing a filter therein, said sheet guiding efflux generated at the writing table to said filter.

8. Apparatus as defined in claim 1 in which said extractor includes a plurality of wheels frictionally and rotatably engaging said paper as it emerges from said writing table.

9. Apparatus as defined in claim 8 in which each said wheel has an arcuate segment and a flat segment thereon, the flat segment being normally positioned adjacent said paper and out of contact therewith, said wheels being rotatable to bring the arcuate segments thereof into contact with said paper when said paper is to be removed from said writing table.

10. Apparatus as defined in claim 1 in which said extractor comprises:
A. a pair of wheels having an arcuate segment for contact with said paper and a flat segment for passage of paper thereby,
B. a driving shaft connected to rotate said wheels opposite a friction surface, and
C. means guiding said paper from said writing table to a position between said wheels and said friction surface,
D. said driving shaft rotating the flat segment of said wheels toward said paper when the paper is not to be moved by said wheels, and rotating the arcuate segment of said wheels into frictional contact with said paper when the paper is to be removed from the writing table.

11. Apparatus as defined in claim 10 which includes:
A. a platform positioned to receive paper ejected from said wheels,
B. clamping means positioned to contact paper ejected thereon,
C. a spring urging said platform against said clamping means, and
D. a bale
1. operable to contact said platform and move it away from said clamping means when a paper is received on said platform, and
2. retractable to allow said spring to return said platform toward the clamping means to thereby clamp said paper thereon.

12. Apparatus as defined in claim 11 in which the paper guiding means comprises said first and second spaced plates between which the paper moves, said first plate having apertures therein through which the extractor wheels extend to frictionally engage said paper therein.

13. Apparatus as defined in claim 12 in which said second plate has resilient yielding means associated therewith and extending toward said first plate opposite said wheels, said yielding means being spaced from said wheels when the flat segments thereof are opposite said yielding means and contacting the arcuate segments of said wheels when said arcuate segments are opposite said yielding means.

14. Record paper handling apparatus comprising
a paper supply comprising a roll of paper on which a message is to be printed and which is to be cut into sheets carrying such messages,
means feeding said paper to a work station,
means for cutting said paper into sheets, and
a sheet-receiving station following said work station including a lower plate and an upper plate between which a sheet is fed, said upper plate having an aperture in which said sheet is exposed,
an extractor wheel disposed above said upper plate and positioned so that its surface can enter said aperture and it can engage and feed a sheet of paper present between said upper and lower plates, as it is rotated,
a sheet-receiving tray adjacent to said upper and lower plates
a paper-gripping means between a portion of said sheet-receiving tray and said lower plate,
a cam coupled to said extractor wheel and rotating said wheel, and means operated by said cam for moving said tray downwardly as said extractor wheel feeds a sheet of paper thereon and, after the sheet of paper falls onto said tray, moving said tray upwardly, with the end of the sheet of paper held between and gripped by said paper-gripping means.

15. The apparatus defined in claim 14 wherein said last-named means comprises a bale having one end engaging said tray and adapted to move said tray downwardly as it is pivoted, a spring-biased bar beneath said tray urging it upwardly against said lower plate, and a mechanical linkage coupling said bale to said cam so that, as the bale is pivoted, it moves said tray downwardly during a portion of its path of rotation, said bar urging said tray upwardly during another portion of the path of rotation of said cam.

16. The apparatus defined in claim 15 and including a spring-biased lever coupled to said cam and adapted to impart energy to said cam during a portion of the path of travel of said cam to assist the operation of said bale.

17. The apparatus defined in claim 14 wherein said cam carries a pin and said mechanical linkage includes a lever having a slot in which said pin rides.

* * * * *